Sept. 14, 1937.    J. BATTALINE    2,093,123

CONTAINER

Filed Aug. 26, 1935

INVENTOR
John Battaline

ATTORNEY

Patented Sept. 14, 1937

2,093,123

UNITED STATES PATENT OFFICE 2,093,123

CONTAINER

John Battaline, Hartford, Conn.

Application August 26, 1935, Serial No. 37,922

20 Claims. (Cl. 221—11)

My invention relates to containers.

It has among its objects to provide an improved container, and, more particularly, an improved container of the pouring type. Further objects of my invention are to provide such a container having improved automatically projecting pouring or spout means and improved means for automatically retracting the pouring spout. Other objects of my invention are to provide such automatically projected and retracted spout means operative upon movement or rotation of one portion of the container relative to another, including improved means normally biasing a movable spout toward projected position, and improved cam means operative to effect the withdrawal or retraction of the spout. Still further objects of my invention are to provide such an improved structure adapted to provide an effective closure and seal, while producing a container which may be readily and quickly opened, and which further may be manufactured at small expense and which is adapted to use in connection with a wide variety of materials while further serving effectually to empty the latter completely from the container. These and other objects and advantages of my improved construction will, however, hereinafter more fully appear.

In the accompanying drawing, I have shown for purposes of illustration one embodiment which my invention may assume in practice, the same being illustrated in connection with a metallic container such as is adapted to use in connection with coffee or the like, although it will be understood that my invention is in nowise limited to use in metallic containers.

In this drawing.

In this illustrative structure, it will be noted that I have shown a container comprising a bottom portion 1 and a top or cover portion 2, the same being relatively rotatable and having an improved spout 3 movable into and out of a pouring position wherein it projects through the cover 2, and having improved means normally biasing the same to pouring position and for controlling the projection and retraction of the spout, all as hereinafter more fully described.

Figure 5:
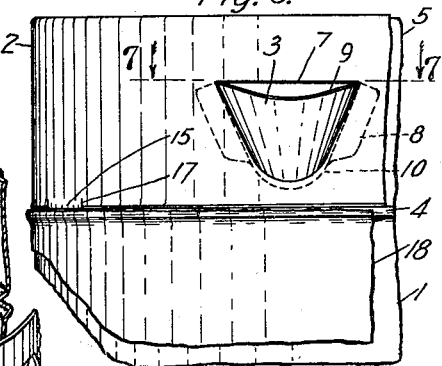
Fig. 5 is a side elevation of a portion of the container shown in Figure 1 looking directly at the open spout.

Referring more particularly to the container comprising portions 1 and 2, it will be noted that the portion 1 herein forms the body, and that the cover portion 2 is disposed thereon for rotation. More particularly, it will be noted that herein a bead 4 is formed on the body 1 against which the bottom edge of the top 2 is adapted to be received when the cover is in position on the body portion 1, while the latter portion is also provided with an upstanding portion 5 of slightly smaller diameter than the bead 4 and adapted to be received in the top 2, and closely fit the latter, preferably clear to the top thereof. Moreover, it will be noted that an aperture 6 is herein provided in this portion 5 through which the spout 3 is adapted to project as hereinafter described. This aperture herein is of a shape generally corresponding in shape to a vertical cross section through the spout when in open position, and is adapted substantially to fit the spout in the open position thereof, while providing a closure around the sides and bottom of the spout preventing the escape of material through anything other than the spout. While the shape of the aperture 6 may be varied to cooperate with different forms of spout, it will be noted that herein the same is provided with diverging sides and a rounded bottom and a horizontal top. Further it will be noted that a corresponding aperture 7 is provided in the cover 2 adapted to be brought into registry with the aperture 6 in one angular relation of the portions 1 and 2, this aperture preferably, however, as herein, having its rounded bottom disposed slightly above the bottom of the aperture 6 in the registering position of the parts, as illustrated in Figure 5, and its diverging sides slightly closer at the bottom in order to permit it to fit more exactly the spout 3 illustrated herein.

Referring to this spout 3 more in detail, it will be noted that the same is herein in top plan and cross section at different points in its height, of substantially the same cross section as the apertures 6 and 7, and that the same cooperates therewith when in open position to form a closure preventing the escape of material around the edges of the spout. Moreover, it will be noted that herein the spout is provided with laterally extending wing members 8 adapted further to prevent the escape of material along the sides of the spout, while also forming stop members engageable with the inside surface of the portion 5 along opposite edges of the aperture 6. These wing members herein preferably are elongated vertically, as shown. Moreover, it will be noted that the top of the spout 3 is preferably curved, as shown at 9, in such manner as to bring it close to the straight or horizontal top of the apertures 6 and 7 in the open position of the spout, while permitting the spout also to move freely inward about an axis of pivotation substantially below this straight top of the apertures. As shown, the spout further is provided with cut away portions 10 at each side, and with means acting upon the spout, herein at its lower end, between these cut away portions which normally bias the spout to pouring position. These means may obviously assume different forms and be formed of different materials. Herein, however, they are illustrated in the form of a spring member 11, preferably a plate spring, suitably attached, as by forming or soldering, to the inclined bottom of the spout midway between the diverging sides thereof, and having a curved portion extending inwardly and downwardly below the bottommost portion of the spout which is inside the container, and then outwardly again and downward along the inside of the body portion 1, to which the same is also suitably attached as by forming or soldering. Herein the portion of the spring 11 attached to the spout is illustrated at 12, and that attached to the inside of the body portion 1 is indicated at 13.

Figure 1:
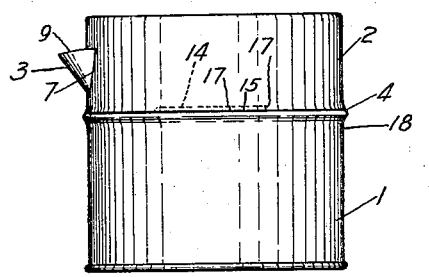
Figure 1 is a side elevation of a container showing the same with the spout in pouring position.
Figure 2:
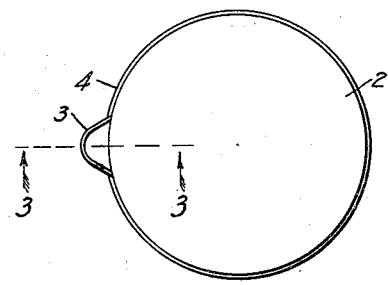
Fig. 2 is a top plan view of the container shown in Figure 1.
Figure 3:
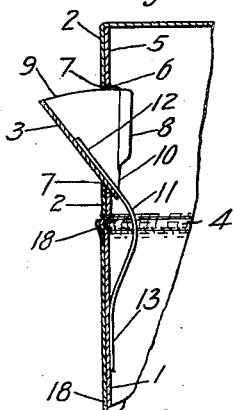
Fig. 3 is an enlarged detail sectional view on line 3—3 of Figure 2, also showing the parts in open position.
Figure 4:
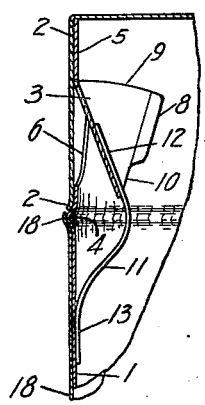
Fig. 4 is a like sectional view but showing the parts in closed position.
Figure 8:
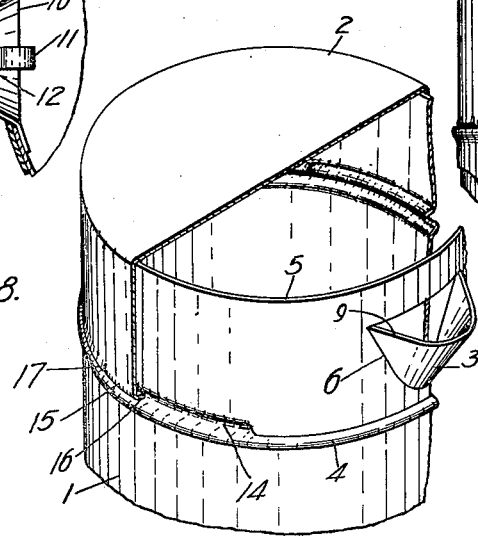
Fig. 8 is a perspective view of the parts in open position with a part of the cover broken away to facilitate illustration.

Attention is also directed to the connection between the portions 1 and 2 of the container, herein disposed below the spout and adjacent the bead 4. As shown, these means include an inwardly extended or bent groove 14 in the portion 5 adjacent and just above the bead 4, while they also include a cooperating inwardly bent portion 15 on the portion 2 having an inwardly bent edge 16 bent in between spaced vertical slits 17 in the bottom edge of the cover 2. Thus, with the portion 15 adapted to engage at its opposite ends with the ends of the groove 14, and the latter groove of substantially greater length than the portion 15, it is made possible not only to retain the cover 2 on the body portion 1, but to limit the relative rotation of the parts in such manner as, at one limit of travel to insure the disposition of the apertures 6 and 7 in registry as, for example, shown in Figures 1, 2, 3, 5 and 7, and at the opposite extreme position of the parts have the apertures 6 and 7 disposed in the closed position of the parts illustrated in Figures 4 and 6. As shown in Figure 8, two sets of cooperating grooves and members 14 and 16 are provided, oppositely located relative to one another substantially midway around the container from the spout, although it will be evident that the same are not limited to location in this preferred position.

Figure 6:
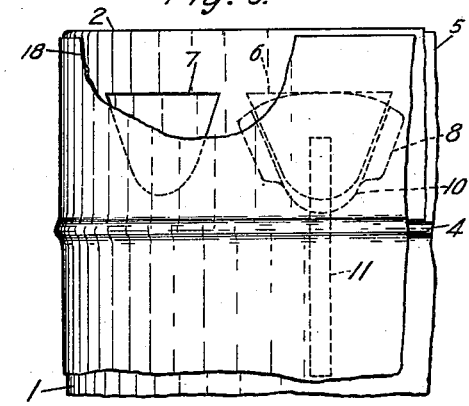
Fig. 6 is a similar view showing the container in closed position, and with a portion of the sealing wrapper broken away to expose the aperture in the cover member, and the spout indicated in dotted lines.
Figure 7:
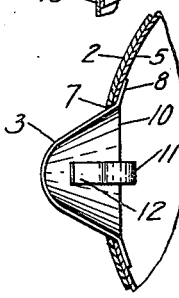
Fig. 7 is an enlarged sectional view substantially on line 7—7 of Figure 5 showing the spout in pouring position.

Attention here is further directed to the fact that when the apertures 6 and 7 are out of registry and in their closed position, which they will occupy when the members 15 are at the proper limit of the grooves 14 to bring the apertures 6 and 7 to the relative positions shown in Figure 6, the aperture 7 will be closed by close contact with a portion of the part 5 on the body 1. Further, it will be noted that due to this close fit between the part 5 and the cover 2 and the extended areas of the parts 2 and 5 which are in close contact around the aperture 7, the closure is a very effective one. Moreover, it will be noted that I contemplate the use of further supplementary sealing means adapted further to effect the closure, the same herein being in the form of a usual adhesively attached label or wrapper 18 adapted to overlie the whole surface of the side of the can and the bead 4 and bottom portion 1 in a well known manner, in such manner as to provide a further cooperating sealing means adapted with the above described close fitting closure means surrounding the aperture 7, to produce a very effective closure substantially equivalent to a vacuum seal. Here also it will be understood that I contemplate the use, if desired, of a label seal which overlies the aperture 7, with or without a sealing band extending around the bead 4 and overlying the adjacent edges of the parts 1 and 2 below the aperture 7.

As a result of my improved construction, it is made possible to fill the portion 1 to the top of the part 5 thereof, and then apply the cover portion 2 with facility. Thus, the cover 2 may be placed on the body 1 with the spout 3 projecting through the apertures 6 and 7 when the same are in registry, and the cover 2 may then be turned relative to the body 1 to the desired position to bring the portions 15 into the desired position in the grooves 14; these portions 15, due to their resiliency, tending to snap into holding relation in the groove as the parts are brought together, or, if desired, being pressed inward after assembly in such manner as to make them hold. With the spout then in the closed position shown in Figures 4 and 6, the parts 1 and 2 are relatively rotated to the opposite limit of their relative permissible movement, and then the label 18 is applied. It will be noted, however, that if desired, the cover 2 may be applied to the body 1 in any angular position, the depending rim portion on the cover 2 when being pressed against the outer edge of the spout 3, forcing the latter inward into closed position, and the parts then being rotated until the portions 15 snap into the grooves 14 in the desired closed position of the parts.

Irrespective of the method of assembly, it will be evident that due to the sealing area around the aperture 7 and the presence of the label 18 covering this aperture and further sealing the same, a very effective closure is produced adapted to prevent the entry of air for a long period, as during shipment or storage.

When the container comes into the hands of the user, the same may be prepared for opening in a usual manner, as by running a knife around the bead 4, and the portion of the wrapper overlying the aperture 7 may be readily torn away. Thereupon, by simply relatively rotating the portions 1 and 2, the apertures 6 and 7 will be brought into registry, and due to the means 11 biasing the spout 3 to open position, the spout 3 will be automatically projected through these apertures when in registry, in such manner as to provide an effective spout permitting pouring out of the contents of the container as desired. Further, it will be noted that after such pouring, the container may be again very effectually closed by merely reversely rotating the parts 1 and 2 from one limit of the grooves 14 to the other limit thereof; one edge of the aperture 7 then engaging the adjacent corresponding surface of the spout 3 with a camming action in such manner as to force the spout 3 inward against the action of the spring 11 from the open position shown in Figure 3 to the closed position shown in Figure 4 while the parts 1 and 2 are being relatively rotated. Moreover, in this closed position, due to the contact of the portions 5 and 2 over a substantial area around the aperture 7, it will be apparent that the container will be very effectively closed in such manner as effectually to protect the contents against the entry of air or moisture.

As a result of my improved construction, it will be observed that not only is an automatically projected and retracted spout provided, but that the same is provided in a form which enables complete emptying of the contents of the container. Thus, for example, in using the same for coffee or the like, it is found, on bodily removing the cover, that all of the coffee has been poured out of the container through the spout. Moreover, due to the improved closure means provided, it is found possible to produce a closure which is, to all intents and purposes, the equivalent of a vacuum closure up to the time that the container is opened by the user, and which further is also as effective as such a vacuum closure after its initial opening by a user, while also possessing the marked advantage of convenient pouring and closing through the automatically projected and retracted spout. These and other advantages of my improved construction will, however, be clearly apparent to those skilled in the art.

I also contemplate the use with certain materials, of the spout pressing directly against the label during shipment, the apertures 6 and 7 then being in registry and the spout being held against projection by the label, while I also contemplate the provision of a line or a weakened portion in the form of a line, or, if desired, of the shape of the spout or aperture, which indicates where slitting or tearing off is desired in order to permit the spout to spring out into pouring position upon removal of the portion of the label which holds it in retracted position. Also, it will be understood that, if desired, although such a construction is not preferred, my improved structure may be disposed on the top rather than the side of the container, the aperture in the outer cover portion then being in the top thereof, and the spout and its cooperating aperture then being carried on a top portion provided on the container body, such a construction having the advantage that a relatively shallow top member may be used, and requiring a minimum of overlap between the top member or cover and the body of the container, in addition to permitting end pouring where this is desired.

While I have in this application specifically described one embodiment which my invention may assume in practice, it will be understood that this form of the same is shown for purposes of illustration, and that the invention is not limited thereto and may be modified and embodied in various other forms without departing from the spirit or the scope of the appended claims.

What I claim as new and desire to secure by Letters Patent is:—

1. In a container, relatively movable cooperating portions including a portion having an aperture therein and a portion carrying a spout movable relative thereto and through said aperture, and means for automatically projecting said spout through said aperture into pouring position upon relative movement of said portions.

2. In a container, relatively movable cooperating portions including a portion having an aperture therein and a portion carrying a spout movable relative thereto and projecting through said aperture in pouring position, and means for automatically retracting said spout upon relative movement of said portions.

3. In a container, relatively movable cooperating portions including an outer member having an aperture therein movable into open position and an inner member carrying a spout movable relative thereto and through said aperture, and resilient means acting on said spout for automatically projecting the same through said aperture into pouring position as said portions are moved into open position.

4. In a container, relatively movable cooperating portions including an outer member having an aperture therein and an inner member having a spout movable relative thereto and projecting through said aperture in pouring position, and camming means cooperating with said spout and automatically retracting the same through said aperture upon relative movement of said portions.

5. In a container, relatively movable cooperating portions including an outer member having an aperture therein movable into and out of pouring position and an inner member having a spout movable relative thereto into and out of said aperture, and cooperating means for automatically projecting said spout through said aperture into pouring position upon relative movement of said portions into pouring position and for automatically retracting said spout upon relative movement of said portions out of pouring position.

6. In a container, relatively movable cooperating portions having apertures therein movable into registry and one portion carrying a spout movable relative thereto, and means for projecting said spout into pouring position and through said apertures as they are moved into registry.

7. In a container, relatively movable cooperating portions having apertures therein movable into and out of registry and one carrying a spout movable relative thereto, means for projecting said spout through said apertures as they are moved into registry, and means by which said spout is retracted as said apertures are moved out of registry.

8. In a container, relatively movable cooperating inner and outer portions, one having an aperture and the other disposed over said aperture in closed position and movable laterally relative to said aperture into open and closed positions, spout means carried by said inner portion, and means disposed inside said container when said aperture is closed for automatically projecting said spout means through said aperture and into pouring position when said aperture is opened.

9. In a container, relatively movable cooperating inner and outer portions operatively connected for relative movement in closed and open positions of said container, one having an aperture and the other disposed over said aperture in closed position, spout means carried by said inner portion, and means biasing said spout means to pouring position and disposed inside said container and automatically projecting said spout means into pouring position through said aperture when the latter is opened.

10. In a container, relatively movable cooperating inner and outer portions, the former having an aperture and the latter being reversely slidable on the former while connected thereto to open and close said aperture, spout means carried by said inner portion, means disposed inside said container for automatically projecting said spout means into pouring position through said aperture when the latter is open, and means for effecting retraction of said spout means actuated upon closing said aperture.

11. In a container, relatively movable cooperating inner and outer portions connected together in all positions thereof for reverse lateral opening and closing movements, spout means carried by said inner portion and disposed inside said container in inoperative position in one position of said portions, means for automatically projecting said spout means into pouring position in another position of said portions, and means for automatically returning said spout means to inoperative position and closing said container upon relative movement of said portions.

12. In a container, relatively movable cooperating inner and outer portions, spout means carried in said inner portion when said container is closed, means disposed inside said container for automatically projecting said spout means into pouring position in one position of said portions, and means for automatically returning said spout means to its position inside said container upon relative movement of said portions.

13. In a container, relatively movable cooperating inner and outer portions operatively connected for selective movement into pouring and closed positions while connected, spout means carried in said inner portion when said container is closed, means disposed inside said container for automatically projecting said spout means into pouring position in one position of said portions, means for automatically returning said spout means to its position inside the container upon relative movement of said portions, and removable means for preventing relative movement of said portions in the closed position of the parts.

14. In a container, a bottom portion having a rim and an opening in the latter, spout means carried by said portion, means biasing said spout means to pouring position in said opening, and a cooperating rotatable top portion having a rim and an opening therein movable over said first mentioned opening into pouring position and through which said spout means is automatically projected by said biasing means.

15. In a container, a bottom portion having a rim and an opening in the latter, spout means carried by said portion, means biasing said spout means to pouring position in said opening, a cooperating rotatable top portion having a rim and an opening therein through which said spout means is automatically projected into pouring position by said biasing means in one position of said portions, and means for automatically retracting said spout means as one portion is moved relatively to the other.

16. In a container, relatively movable cooperating inner and outer portions, one having an aperture and another slidable laterally on the other relative to said aperture and disposable over said aperture in closed position, spout means carried by said inner portion, means disposed inside said container when said aperture is closed for automatically projecting said spout means through said aperture and into pouring position when said aperture is open, and means for closing the space around said spout means in the pouring position of the latter.

17. In a container, relatively movable cooperating inner and outer portions, one having an aperture therein and the other having spout means movable relative thereto and means for projecting said spout means through said aperture in pouring position, means actuated upon relative movement of said portions for effecting withdrawal of said spout means from said aperture into said inner portion, and means for substantially sealing said container upon relative movement of said portions into closed position.

18. In a dispensing device, a container having an aperture therein, spout means inside said container and carried thereby, means biasing said spout means to pouring position for projecting said spout means through said aperture, and means for inhibiting said projection disposed in the path of said spout means and slidable laterally relative to said aperture into and out of said path.

19. In a dispensing device, a container having an aperture therein, spout means inside said container and carried thereby, means biasing said spout means to pouring position for projecting said spout means through said aperture, means slidably mounted on said container for inhibiting said projection disposed in the path of said spout means slidable laterally into and out of said path, and means operable upon closing movement of said slidably mounted means to retract said spout means.

20. In a dispensing device, a container having an aperture therein, spout means inside said container and carried thereby, means biasing said spout means to pouring position for projecting said spout means through said aperture, reversely slidable closure means for inhibiting said projection disposed in the path of said spout means and slidable on said container into and out of said path, and means carried by said closure means for automatically returning said spout means into said container upon relative movement between said closure means and said container.

JOHN BATTALINE.

CERTIFICATE OF CORRECTION.

Patent No. 2,093,123.　　　　　　　　　　　　　　September 14, 1937.

JOHN BATTALINE.

It is hereby certified that in line 3 of Certificate of Correction issued October 19, 1937 in the above numbered patent, the words "page 2" should read page 4; so that the said Certificate may conform to the record of the case in the Patent Office.

Signed and sealed this 2nd day of November, A. D. 1937.

Henry Van Arsdale,
　　　　　　　　　　　　　　　　　Acting Commissioner of Patents (Seal)